United States Patent
Wise et al.

(10) Patent No.: US 6,650,466 B1
(45) Date of Patent: Nov. 18, 2003

(54) HIGH-ENERGY PULSE COMPRESSION USING PHASE SHIFTS PRODUCED BY THE CASCADE QUADRIATIC NONLINEARITY

(76) Inventors: Frank Wise, 142 Whitetail Dr., Ithaca, NY (US) 14850; Qian Liejia, Dept. of Physics and Applied Engineering Cornell University, Ithaca, NY (US) 14850; Xiang Liu, 150 West Village Pl., Ithaca, NY (US) 14850

(*) Notice: Subject to any disclaimer, the term of this patent is extended or adjusted under 35 U.S.C. 154(b) by 0 days.

(21) Appl. No.: 09/384,500

(22) Filed: Aug. 27, 1999

(51) Int. Cl.$^7$ .................................................. G02F 1/35
(52) U.S. Cl. ...................................................... 359/328
(58) Field of Search ................................ 359/183, 328; 385/122; 375/240

(56) References Cited

U.S. PATENT DOCUMENTS

| | | | | |
|---|---|---|---|---|
| 4,655,547 A | * | 4/1987 | Heritage et al. | 350/162.12 |
| 4,928,316 A | * | 5/1990 | Heritage et al. | 455/600 |
| 4,961,195 A | * | 10/1990 | Skupsky et al. | 372/31 |
| 5,222,161 A | * | 6/1993 | Chang et al. | 385/2 |
| 5,317,666 A | * | 5/1994 | Agostinelli et al. | 385/122 |
| 5,815,307 A | * | 9/1998 | Arbore et al. | 359/328 |
| 5,956,131 A | * | 9/1999 | Mamyshev et al. | 250/227.18 |
| 6,108,474 A | * | 8/2000 | Eggleton et al. | 385/122 |

OTHER PUBLICATIONS

Min et al. "Extended Range of Second Harmonic Generation in Beta–Barium metaborate", IEEE Journal of Quantum Electronic vol. 34, No. 12, Dec. 1998, p. 3409.*

H. Hakimi., K.L. Hall, K.A. Rauschenbach, 'A New Wide-Band Pulse–Resotration Technique for Digital Fiber–Optic Communication Systems Using Temporal Gratings', IEEE Photonics Technology Letters, vol. 11, No. 8, Aug. 1999, pp. 1048–1050.*

Jeff Squier, Francois Salin, Gerard Mourou, and Donald Harter. 100–fs pulse generation and amplification in Ti: A1203, Optics Letters, 1991, pp.324–326, University of Michigan, Ann Arbor, Michigan and Allied Signal Corporation, Morristown, New Jersey, U.S.A.

C. Rolland and P. B. Corkum, Compression of High–Power Optical Pulses. J.Opt.Soc.Am.B/vol.5, No. 3, Mar. 1998, pp.641–647, Div. of Physics, Ottawa, Ontario, Canada.

M. Nisoli, S. De Silvesltri and O. Svelto. Generation of High Energy 10 fs Pulses by a New Pulse Compression Technique. Appl. Phys. Lett 68, pp. 2793–2795. May 1996. Centro de Elettronica Quantistica e Strumentazions Ellettronica, Milano, Italy.

Y. Wang & Barry Luther–Davies. Frequency–doubling Pulse Compressor for Picosecond High–Power Neodymium Laser Pulses. Optics Letters/vol. 17, No. 20/Oct. 15, 1992. Laser Physics Centre, Australian National University, Canberra, Australia.

(List continued on next page.)

Primary Examiner—Thomas G. Black
Assistant Examiner—Deandra Hughes
(74) Attorney, Agent, or Firm—Stephen B. Salai; Donna P. Suchy; Harter, Secrest & Emery LLP (57) ABSTRACT

We report an optical pulse-compression technique based on quadratic nonlinear media. Negative nonlinear phase shifts are generated via phase-mismatched second-harmonic generation, and the phase-modulated pulses are then compressed by propagation through materials with normal dispersion. Millijoule-energy pulses from a Ti:sapphire amplifier are compressed from 120 to 30 fs, and calculations indicate that compression ratios>10 are realistically achievable using this approach with optimal materials. The insertion loss of the compressor can be less than 10% of the pulse energy, and scaling to higher pulse energies will be straightforward.

35 Claims, 4 Drawing Sheets

OTHER PUBLICATIONS

A. Dubietis, G. Valiulis, R. Danielius, and A. Piskarskas. Fundamental–frequency Pulse Compression through Cascaded Second–Order Processes in a Type II Phase–Matched Second–Harmonic Generator. Optics Ltrs. vol.21,No. Aug. 1996. Vilnius University, Lithuania.

A. Dubietis,S G. Valiulis, G. Tamosauskas, R. Danielius and A. Piskarsjas. Nonlinear Second–Harmonic Pulse Compression With Tilteld Pulses. Optics Letters/vol.22/No. 14, Jul. 1997. Laser Research Center, Vilnius University, Lithuania.

H. J. Bakker, P. C. M. Planken, L. Kuipers, and A. Lagendijk. Phase Modulation is Second–Order Nonlinear–Optical Processes. Phy.Rev. vol.42/No. 7, pp.4085–4101. Oct. 1, 1990. Inst.for Atomic & Molecular Physics, Amsterdam, The Netherlands.

R. De Salvo, D. J. Hagan, M. Sheik–Bahae, G. Stegeman, and H. Vanherzeele. Self–Focusing and Self–Defocusing by Cascaded Second–Order Effects in KTP. Optics Letters/vol. 17 No. 1, Jan. 1, 1992, pp. 28–30. Center for Research, U. of Central Florida, Orlando, Florida.

P. Vidakovic, D. L. Lovering, A. Levenson, J. Webjorn, and P. St. J. Russell. Large Non Linear Phase Shift Owing to Cascaded X(2) in Quasi–Phase–Matched Bulk LiNb03. Optics Letters vol.22,No.5,pp. 277–279, Mar. 1, 1997. France Telecom, France.

L. J. Qian, X. Liu, and F. W. Wise. Femtosecond Kerr–lens Mode Locking with Negative Nonlinear Phase Shifts. Optics Letters. vol. 24, No. 3, pp. 166–168. Feb. 1, 1999. Dept.of Applied Physics, Cornell University, Ithaca, New York.

X. Liu, L. J. Qian, and F. W. Wise. Generation of Optical Spatiotemporal Solitons. Phys.Rev.Letters vol. 82, No. 23, pp. 4631–4634. Jun. 1999. Dept of Applied Physica, Cornell University, Ithaca, New York.

C. P. J. Barty, C. L. Gordon, III and B. E. Lemhoff. Multiterawatt 30–fs Ti:sapphire Laser System. Optics Letters, vol. 19, No. 18, pp. 1442–1444.Stanford University, Stanford, California, USA., 9/94.

* cited by examiner

HIGH-ENERGY PULSE COMPRESSION USING PHASE SHIFTS PRODUCED BY THE CASCADE QUADRIATIC NONLINEARITY

BACKGROUND OF THE INVENTION

Pulse compression is an established technique for generating optical pulses shorter than those produced directly by lasers or amplifiers. Most commonly, additional bandwidth is generated by self-phase modulation (SMP) as the pulse propagates nonlinearly in an optical fiber. The negative group-velocity dispersion (GVD) required to compress the pulse is typically provided by gratings or prisms. Compressors based on single-mode fibers are limited to nanojoule pulse energies by higher-order nonlinear effects, and ultimately by damage to the fiber. Thus, new approaches are needed for compression of the high-energy pulses that are now readily available from chirped-pulse amplifiers, for example.

Bulk materials can be used for pulse compression. However, several third-order nonlinear-optical processes occur when high-energy femtosecond-duration pulses interact with a solid. The output beam typically has different frequencies propagating in different directions, and is difficult to control. As a consequence, the use of bulk third-order materials for pulse compression has not found significant use.

One possible solution to this problem was reported by Nisoli et al. These workers achieved large spectral broadening by propagating pulses through a high-pressure noble gas confined in a hollow-core waveguide of fused silica. Excellent results were obtained, including compression from 140 to 10 fs. Pulse energies as high as 240 $\mu$J were produced with 660-$\mu$J input pulses. Although the compressed pulse energy is a substantial improvement on that achievable with ordinary fibers, these results do point out a limitation of this approach: because the pulse does not propagate as a guided mode, the waveguide is lousy. Additional drawbacks include the susceptibility of the waveguide to optical damage, the complexity associated with handling the high-pressure gas, and a lack of commercially-available components.

Recent work has shown that second-order nonlinearities can be exploited for pulse compression. Following on work by Wang and Luther-Davies, Dubietis et al. Demonstrated that pulses can be compressed in phase-matched type-II second-harmonic generation. This approach relies on group-velocity mismatches (GVM) among the three interacting waves, and requires division of the input pulse into the o- and e-wave components needed for the type-II process as well as an appropriate pre-delay of one of the input fundamental pulses. Compression from 1.3 ps to 280 fs was demonstrated, with energy conversion efficiency of close to 50%. Dubietis and co-workers have also demonstrated the phase-matched generation of second-harmonic pulses shorter than the input fundamental pulse through pulse tilting. Here we show that negative phase shifts produced in phase-mismatched type-I second-order processes can be exploited for effective pulse compression. Our approach is conceptually similar to that employed in traditional compressors: in a first stage the pulse accumulates a nonlinear phase shift, and the pulse is then compressed by dispersive propagation in a second stage. Positive GVD is needed for compression, and this can be provided by a suitably-chosen piece of transparent material. 120-fs pulses are compressed by a factor of 4, and higher compression ratios should be possible. The compressor is efficient, with the compressed pulse amounting to at least 85% of the input-pulse energy.

It has been known for years that the cascading of $\chi^{(2)}$ ($\omega;2\omega,-\omega$) and $\chi^{(2)}(2\omega;\omega,\omega)$ processes leads to a nonlinear phase shift $\Delta\Phi^{NL}$ in a pulse that traverses a quadratic medium under phase-mismatched conditions for SHG or parametric processes. The phase shifts can be either positive or negative, depending on the sign of the phase mismatch $\Delta$kL ($\Delta k=k_{2\omega}-2k_\omega$). Bakker and co-workers performed a theoretical study of the phase shifts generated by three-wave interactions, and large cascade nonlinear phase shifts were later measured in KTP and periodically poled LiNoO$_3$ (PPLN).

BRIEF DESCRIPTION OF DRAWINGS

We recently employed cascade nonlinearities for Kerr-lens mode-locking with $\Delta\Phi^{NL}<0$, as well as the production of pulses that are simultaneously solutions in time and space.

The novel aspects of the invention are set forth in the appended claims. The invention itself may be more fully comprehended by reference to the following detailed embodiment thereof, taken in conjunction with the following drawings in which:

FIG. 1 is a graph of the calculated spectrum (a) and intensity profile (b) of a compressed pulse. Dashed lines are for the input pulse;

FIG. 2 is a graph of the measured spectrum (a) and autocorrelation of the transform-limited pulse (c) derived from the measured spectrum is also shown (solid) in (b) for comparison. In (a) and (b) the dashed lines are for the input pulse. The temporal phases of the pulse before (dashed) and after (solid) the dispersive propagation stage are shown in (d), with the compressed pulse intensity shown (dotted) for reference. Note that the pulse duration is ~140 fs before GVD compensation;

FIG. 3 is a graph of the calculated spectra (a) and intensity profiles (b) for compressino of a 200-fs pulse at 1.55 $\mu$m. A 2-cm PPLN crystal is assumed, with incident intensity 20 GW·cm$^2$ and $\Delta$kL=+800$\pi$. Dashed lines are for the input pulse.

Figure 4:
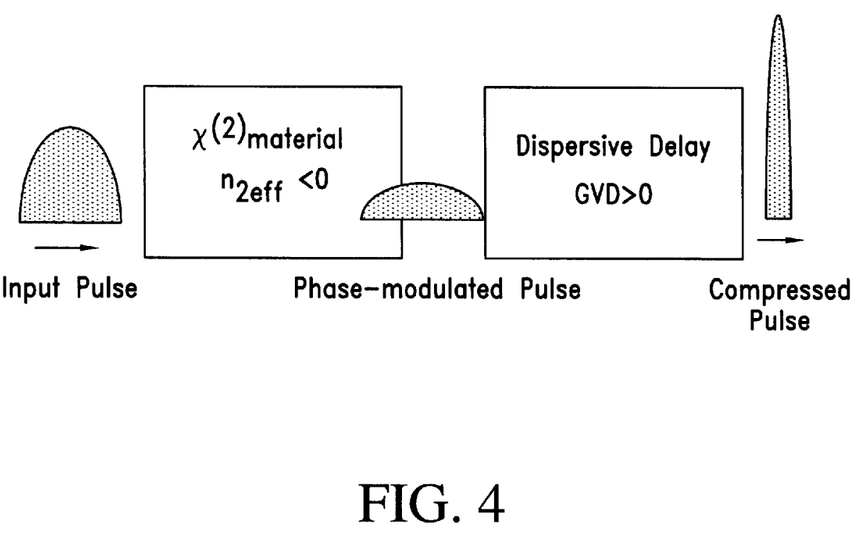
FIG. 4 is a diagrammatic view of a pulse compressor in accordance with the invention.

A pulse compressor in accordance with the invention is shown in FIG. 4. The figure illustratively shows how a pulse that propagates through a medium such as a crystal 20 having a second order nonlinearity (here illustratively shown as a square labeled 'chi-2 material'—for example a crystal capable of generating a second harmonic of the fundamental input frequency of the pulse) can, when propagated through the crystal under phase-mismatched conditions, acquire a phase shift that broadens the bandwidth of the pulse. This phase-modulated pulse is then compressed to a shorter pulse width by passage through a body 30 formed of 'dispersive delay' such as glass material. In the specific case where the chi-2 material produces a negative phase variation on the pulse, compression in achieved by passage through material with positive group velocity dispersion. In the specific case where material produces a positive phase variation on the pulse, compression is achieved by passage through material with positive group velocity dispersion. In the specific case where material produces a positive phase variation on the pulse, compression is achieved by passage through material with negative group velocity dispersion.

DETAILED DESCRIPTION OF THE PREFERRED EMBODIMENT

We take the simplest approach to obtain guidelines for compressor design and performance, and then refine these through numerical solutions of the appropriate wave equations; a systematic analysis of the compressor will be presented elsewhere. In general the maximum compression ratio will be proportional to $\Delta\Phi^{NL}$ impressed on the initial pulse. The phase shift produced by the cascade process can be approximated as:

$$\Delta\Phi^{NL} \propto -\frac{\Gamma^2 \Omega L^2}{\Delta kL} - -(I_0(d_{eff}))^2 L_{GVM} L,$$

with $$\Gamma = \frac{\omega d_{eff} |E_0|}{c\sqrt{n_{2\omega} n_\omega}}.$$

The characteristic group mismatch length $L_{GVM=C\tau 0/(n1_g - n2_g)}$ is introduced with $n_{1_g}$ ($n_{2_g}$) the group index at the fundamental (harmonic) frequency and $\tau_o$ the initial pulse duration. Both intensity and crystal length are limited by practical considerations, and $\Delta\Phi^{NL}$ saturates at high intensity. Therefore, crystals with large values of $d_{eff}$ and $L_{GVM}$ are best for this application. For the compression of 120-fs pulses at 80 nm we chose to use barium metaborate (BBO), which has $d_{eff} \approx 2$ pm/V and GVM coefficient (defined as the difference between inverse group velocities) of 190 fs/mm. The phase shift arising from the Kerr nonlinearity is positive, so materials with small nonlinear indices are desired for the generation of net negative phase shifts. The nonlinear index of BBO is small, $n_2 \approx 5 \times 10^{-16}$ cm$^2$/W. A final advantage of BBO is its lack of 2-photon absorption at 400 nm.

The cascade process produces a highly nonlinear frequency chirp in the presence of GVM, but the chirp can be made linear near the pulse peak by operating at large phase mismatch, at the expense of the magnitude of $\Delta\Phi^{NL}$. This constraint is assumed in the second version of Equation 1. For a crystal length $L=N \cdot L_{GVM}$ it is desirable to have at least 2N conversion-back-conversion cycles, which is arranged by setting $\Delta kL=4N\pi$. For the compression considered here with a 17-mm BBO crystal (provided by Casix, Inc.), this implies $\Delta kL \geq 120\pi$, and we chose $\Delta kL=200\pi$. With intensities of ~50GW/cm$^2$, $\Delta kL \approx +200\pi$ yields a net $\Delta\Phi^{NL} \approx -\pi$, necessary for a compression ratio of roughly 4–6. The large $\Delta kL$ also reduces the effects of walk-off. The frequency chirp produced in the cascade process is not linear across the entire pulse, as it can be in fibers owing to GVD. However, the short fibers used in compression of 100-fs pulses do not provide much GVD, so this property does not represent a disadvantage of the cascade compressor for such short pulses.

In the reference frame of the fundamental pulse, the equations that govern the interaction between fundamental and harmonic fields $E_1$ and $E_2$ propagating in the z-direction are:

$$\frac{\partial}{\partial z}E_1 = iE_1 E_2 e^{i\Delta kz} + i2\pi(n_2 I_0)\frac{L_{NL}}{\lambda}[|E_1|^2] + 2|E_2|^2]E_1$$

$$\left(\frac{\partial}{\partial z} + \frac{L_{NL}}{L_{GVM}}\frac{\partial}{\partial t}\right)E_2 = iE_1 E_1 e^{-i\Delta kz} + i4\pi(n_2 I_0)\frac{L_{NL}}{\lambda}[2|E_1|^2 + |E_2|^2]E_2$$

$E_1$ and $E_2$ are in units of the initial value of the peak fundamental field $E_0$, which is related to the initial peak intensity $I_0$ by $I_0 = \sqrt{\frac{\varepsilon}{\mu}}|E_0|^2/2.$ The length characterizing the nonlinear interaction is $L_{NL}=n\lambda/(\pi\chi^{(2)}E_0)$. Time is measured in units of the input-pulse duration $\tau_0$, and position is measured in units of $L_{NL}$. We solved the wave equations numerically, and the results will be compared to experimental results below.

Input pulses of duration 120 fs and energy 600 $\mu$ at 795 nm are produced by a Ti:sapphire regenerative amplifier. The 7-mm-diameter beam from the amplifier is compressed by a factor of 2 with a telescope to produce intensities of 20–60GW/cm$^2$ on the BBO crystal. IN the second stage of the compressor, a prism pair or a piece of bulk material provides the GVD to compensate the phase shift accumulated in the quadratic medium.

Figure 1A:
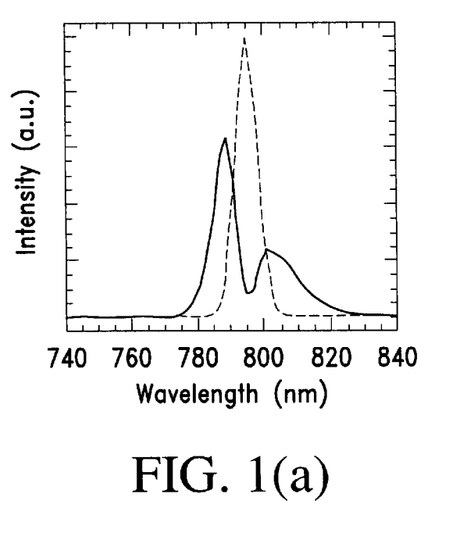
Figure 1B:
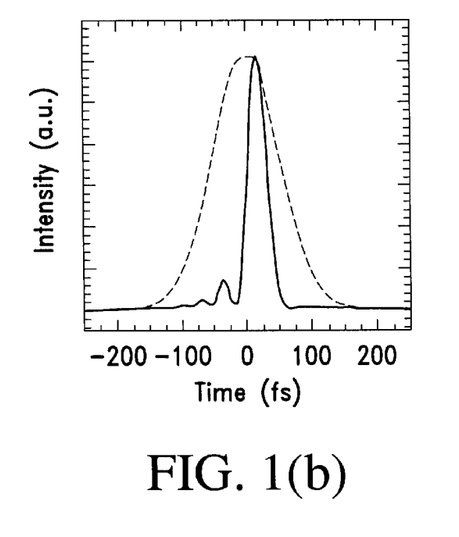
Figure 2A:
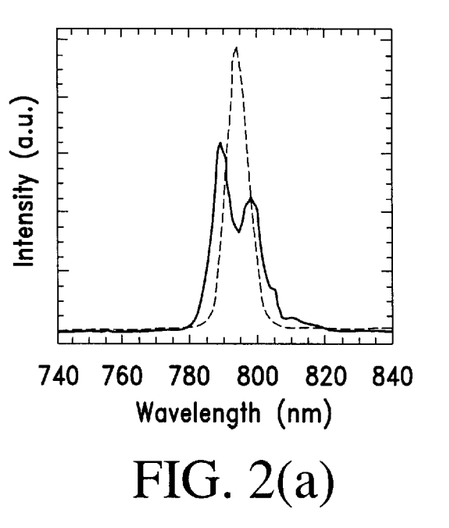
Figure 2B:
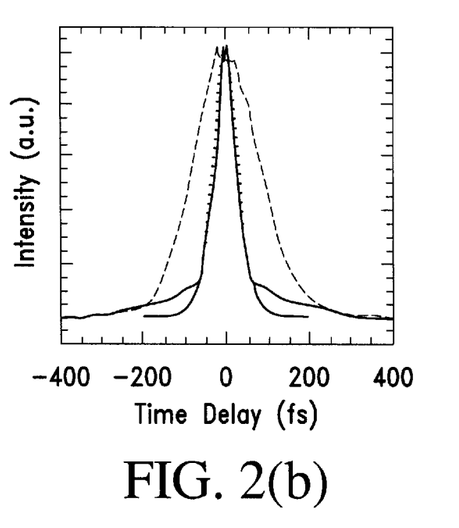
Figure 2C:
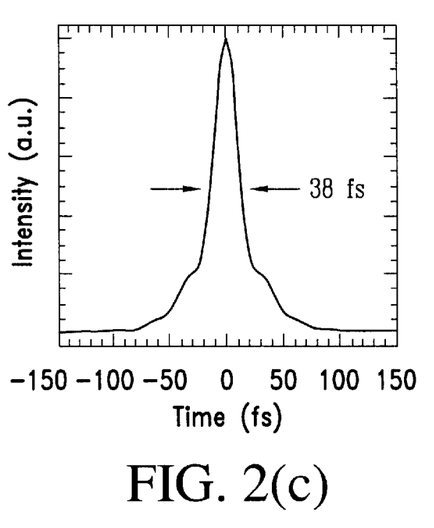
Figure 2D:
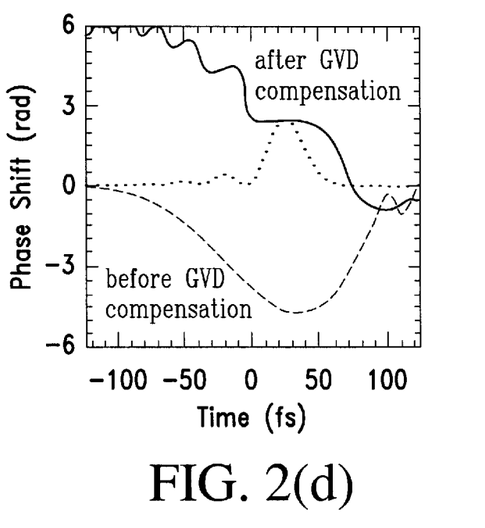

With $\Delta kL=+200\pi$(on the self-defocusing side of the phase-matching) the spectrum is expected to broaden by a factor of ~3 and develop a multiply-peaked structure (FIG. 1((a)). The GVD required to optimally compress the pulse is ~1500 fs, and this should produce a ~30-fs compressed pulse (FIG. 1(b)). The measured spectrum (FIG. 2(a)) and pulse autocorrelation (FIG. 2(b)) produced with a prism pair controlling GVD agree reasonably with calculations. The zero-phase Fourier transform of the experimental spectrum (FIG. 2(c)) produces an autocorrelation (shown in FIG. 2(b)) that agrees with experiment near zero delay, but deviates from the pedestal measured >75 fs from the peak. The calculated phase variation (FIG. 2(d)) indeed implies good compression of the majority of the pulse but some residual phase variation in the wings. Effective compression was realized with $\Delta kL$ between $150\pi$ and $300\pi$. Smaller values of $\Delta kL$ in this range produce the narrowest pulse but increase the energy in the wings, while larger values produce broader pulses of higher quality. The compressed-pulse energy is 520 $\mu$J, which is 86% of the input-pulse energy. SHG at such large phase-mismatch introduces loss of 5% or less. The remainder of the loss could be eliminated by anti-reflection coatings on the BBO crystal.

The use of negative phase shifts permits the construction of a compressor consisting of only the SGH crystal and a piece of bulk material. It is important to avoid excessive nonlinear phase shift and two-photon absorption, so materials with small third-order nonlinearities (and large GVD) are naturally best for the dispersive stage. A 1-cm piece of LiIO$_3$ was available and presents ~1750 fs$^2$ of dispersion (oriented so that no second-order effects occur). Although the dispersion was not optimal, ~30-fs pulses were generated when the LiIO$_3$ crystal replaced the prism pair. Similar compression ratios have been obtained using pieces of calcite and sapphire to provide dispersion. Compressed pulse energies of at least 85% of the input energy were obtained with all three bulk materials. The beam could be expanded before the dispersive stage, although we have not found this necessary.

The compressor based on negative nonlinear phase shifts offers substantial advantages. It is extremely simple, and there are no critical parameters or adjustments. The pulse duration is not very sensitive to the pulse energy, perhaps owing to the saturable nature of the cascade nonlinearity. The beam quality is essentially unchanged by the compression process. Scaling the compressor to energies of at lest 10 mJ is simply a matter of increasing the aperture of the SHG crystal to maintain intensities of ~50 GW/cm$^2$. With 1-mJ and 100-fs pulses the power incident on the SHG crystal is already several orders of magnitude above the critical power for self-focussing via the Kerr nonlinearity, but the Kerr phase shift is compensated by the negative cascade phase shift. In this connection it is worth mentioning that we investigated pulse compression with $\Delta\Phi^{NL}>0$ (obtained with $\Delta kL<0$). Severe beam distortions and spatially-inhomogeneous continuum light accompanied the desire spectral broadening, and precluded effective compression. Given the complications involved in designing chirped-pulse amplifiers capable of producing sub-50-fs pulses with millijoule energies, a 100-fs amplifier plus a quadratic compressor seems to offer a useful alternative approach.

Figure 3A:
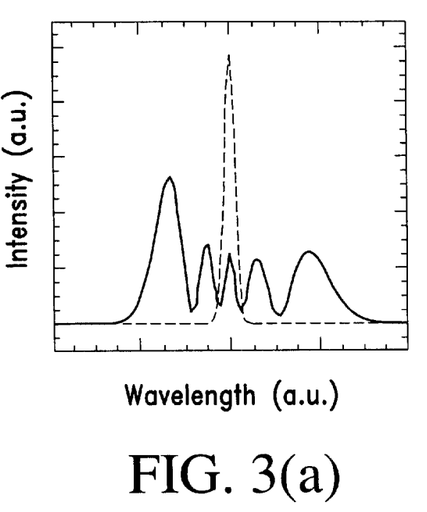
Figure 3B:
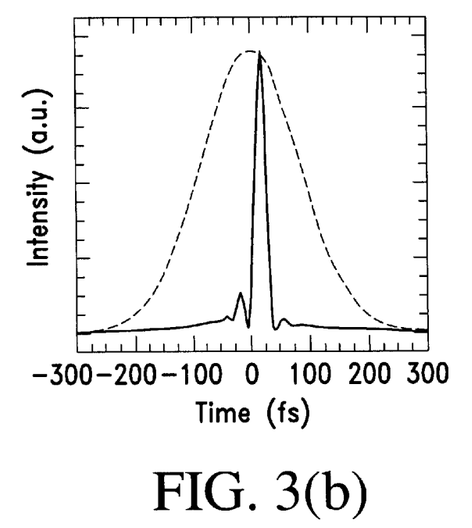

Since the cascade nonlinearity saturates, increasing the pulse energy does not increase the compression ratio as effectively as does the use of longer and/or more nonlinear crystals. A larger $d_{eff}$ allows the use of the cascade process at larger phase-mismatch, where the effects of saturation are reduced. For example, calculations show that 200-fs pulses at 1.55 um may be compressed by a factor of 10 using a 2=cm piece of PPLN (FIG. 3).

SUMMARY OF THE INVENTION

In conclusion, we have demonstrated that pulse compression using negative phase shifts produced by quadratic nonlinearities is effective, and offers some advantages over existing techniques. The simplicity and reliability of this compressor should be attractive for many applications.

This work was supported by the National Institutes of Health under award RR10075, the National Science Foundation under award ECS-9612255, and the Cornell Theory Center. The authors are indebted to CASIX, Inc. for the generous loan of the high-quality BBO crystal used in this work.

What is claimed is:

1. A method of compressing an input optical pulse comprising:
   generating a negative phase variation on the input optical pulse by cascading of phase-mismatched second order processes; and
   propagating said optical pulse through a material with a positive group velocity dispersion creating an output pulse.

2. The method of claim 1 comprising generating the negative phase variation in a first material, and generating the positive group velocity dispersion in a second, different material.

3. The method of claim 1 comprising generating the negative phase variation and positive group velocity dispersion in the material.

4. The method of claim 1 in which the input optical pulse has a fundamental frequency and the output pulse is a harmonic of the fundamental frequency.

5. A pulse compressor comprising:
   a pulse source;
   a non-linear phase shifter characterized by a quadratic non-linearity, coupled to the pulse source so that the phase mismatch, $\Delta KL$, is not equal to 0; and
   a dispersive element coupled to the non-linear phase shifter, the dispersive element having a dispersion selected to compensate for phase shift in the non-linear phase shifter to produce a compressed pulse.

6. The pulse compressor of claim 5 in which the non-linear phase shifter comprises a material having a second order nonlinearity.

7. The pulse compressor of claim 5 in which the dispersive element comprises a glass.

8. The pulse compressor of claim 5 in which the dispersive element comprises sapphire.

9. The pulse compressor of claim 5 in which the material comprises barium metaborate.

10. The pulse compressor of claim 5 in which the material comprises lithium niobate.

11. The pulse compressor of claim 5 in which the material comprises periodically poled lithium niobate.

12. The pulse compressor of claim 5 in which the non-linear phase shifter and dispersive element comprise different materials.

13. The pulse compressor of claim 5 in which the non-linear phase shifter and dispersive element comprise the same material.

14. The pulse compressor of claim 9 in which the non-linear phase shifter and dispersive element comprise the same material.

15. A pulse compressor comprising:
   a pulse source;
   a non-linear phase shifter crystal characterized by a quadratic non-linearity, coupled to the pulse source so that the phase mismatch, $\Delta KL$, is not equal to 0; and
   a dispersive element coupled to the non-linear phase shifter crystal, the dispersive element having a dispersion selected to compensate for phase shift in the non-linear phase shifter crystal to produce a compressed pulse.

16. The pulse compressor of claim 15, the crystal having a second order nonlinearity.

17. The pulse compressor of claim 16 in which the non-linear phase shifter crystal comprises barium metaborate.

18. The pulse compressor of claim 15 in which non-linear phase shifter crystal and dispersive element comprise different materials.

19. The pulse compressor of claim 15 in which the non-linear phase shifter crystal and dispersive element comprise the same material.

20. The pulse compressor of claim 17 in which the dispersive material comprises barium metaborate.

21. The pulse compressor of claim 19 in which the dispersive material comprises barium metaborate.

22. A method of compressing an input optical pulse comprising:
   generating appositive phase variation on the input optical pulse by cascading of phase-mismatched second order processes; and
   propagating said optical pulse through a dispersive structure with negative group velocity dispersion creating an output pulse.

23. The method of claim 22 comprising generating the positive phase variation in a first material, and generating the negative group velocity dispersion in a second, different material.

24. The method of claim 22 comprising generating the positive phase variation and negative group velocity dispersion in the material.

25. The method of claim 22 in which the input optical pulse has a fundamental frequency and the output pulse is a harmonic of the fundamental frequency.

26. A method of compressing an input optical pulse characterized by a first wavelength comprising:
   generating a negative phase variation on the input optical pulse at a harmonic of the first wavelength by cascading of phase-mismatched second order processes; and propagating said pulse having the harmonic wavelength through a material or structure with positive group velocity dispersion.

27. The method of claim 26 comprising generating the negative phase variation in a first material and generating the positive group velocity dispersion in a second, different material.

28. The method of claim 26 comprising generating the negative phase variation and positive group velocity dispersion in the same material.

29. The method of claim 26 in which the material is barium metaborate.

30. The method of claim 28 in which the material is barium metaborate.

31. A method of compressing an input optical pulse characterized by a first wavelength comprising:

generating a positive phase variation on the input optical pulse at a harmonic of the first wavelength by cascading of phase-mismatched second order processes; and propagating said pulse having the harmonic wavelength through a material with negative group velocity dispersion creating an output pulse.

32. The method of claim 31 comprising generating the positive phase variation in a first material, and generating the negative group velocity dispersion in a second different material.

33. The method of claim 31 comprising generating the positive phase variation and the negative group velocity dispersion in the same material.

34. The method of claim 31 comprising generating the positive phase variation and negative group velocity dispersion simultaneously.

35. The method of claim 31 in which the input optical pulse has a fundamental frequency and the output pulse is a harmonic of the fundamental frequency.

* * * * *

UNITED STATES PATENT AND TRADEMARK OFFICE
CERTIFICATE OF CORRECTION

PATENT NO. : 6,650,466 B1  Page 1 of 1
DATED : November 18, 2003
INVENTOR(S) : Wise et al.

It is certified that error appears in the above-identified patent and that said Letters Patent is hereby corrected as shown below:

Column 1,
Line 10, "(SMP)" should read -- (SPM) --.

Column 2,
Line 40, "compressino" should read -- compression --.

Column 4,
Line 7, "$n\lambda/(\pi\chi^{(2)}E_c.$" should read -- $n\lambda/(\pi\chi^{(2)}E_o)$. --.

Line 15, "IN" should read -- In --.
Line 43, 'SGH" should read -- SHG --.

Signed and Sealed this

Third Day of February, 2004

JON W. DUDAS
*Acting Director of the United States Patent and Trademark Office*